April 30, 1935.   E. B. PERRINE   1,999,779
FISHING TACKLE BOX
Filed Sept. 20, 1934
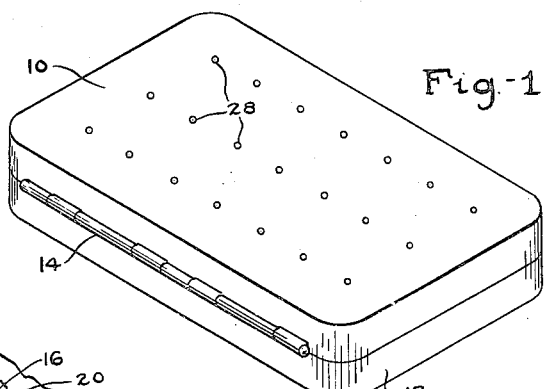
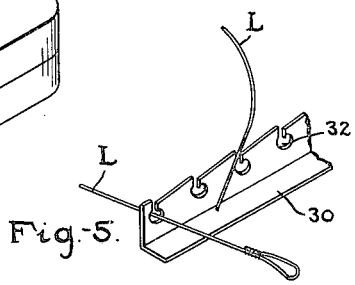
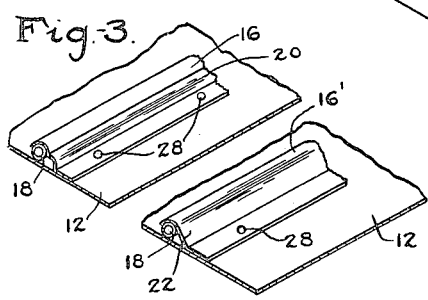
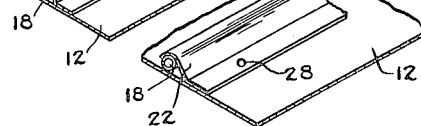
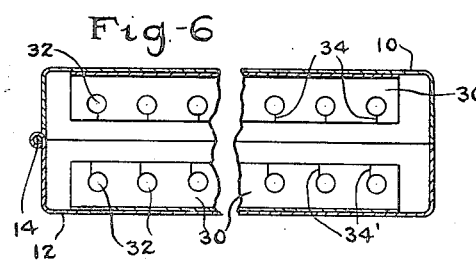
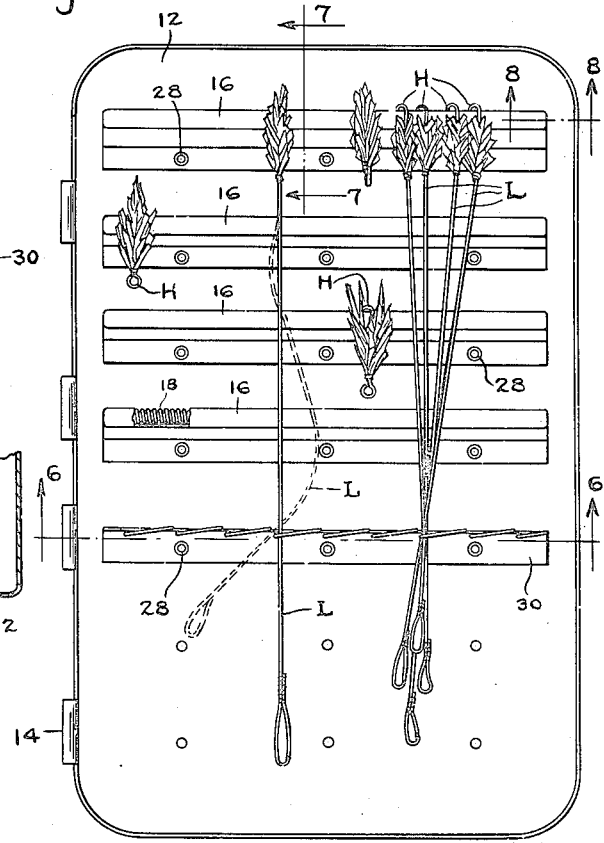
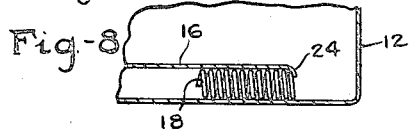
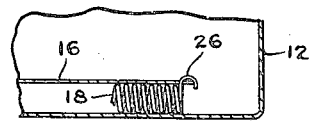
Inventor:
Emmett B. Perrine.
By Whiteley and Ruckman
Attorneys.

Patented Apr. 30, 1935

1,999,779

UNITED STATES PATENT OFFICE 1,999,779

FISHING TACKLE BOX

Emmett B. Perrine, Minneapolis, Minn.

Application September 20, 1934, Serial No. 744,799

6 Claims. (Cl. 43—32)

My invention relates to fishing tackle boxes. An object of the invention is to provide a box of such character with improved means for holding fish hooks and the leaders attached thereto. In carrying out my invention, I provide the box with a housing containing a coiled spring, one side of the housing being arranged to expose the spring so that the hooks may be engaged between adjacent turns of the spring. I also provide a strip having openings in which the free end portions of leaders attached to the hooks may be placed after the hooks have been engaged with the spring. The mounting of the spring in the housing is such that the spring is kept properly in place and yet may yield sufficiently to permit a large number of hooks to be held thereby.

The novel features which I believe to be characteristic of my invention are set forth with particularity in the appended claims. The invention itself, however, both as to its organization and method of operation, together with additional objects and advantages thereof will be best understood from the following description of a specific embodiment when read in connection with the accompanying drawing, in which Fig. 1 is a perspective view of the tackle box in closed condition. Fig. 2 is a plan view on an enlarged scale of one of the members of the box. Fig. 3 is a fragmentary perspective view showing a housing. Fig. 4 is a similar view showing a modified form of housing. Fig. 5 is a fragmentary perspective view showing a construction for holding leaders. Fig. 6 is a view in section on the line 6—6 of Fig. 2. Fig. 7 is a view in section on the line 7—7 of Fig. 2. Fig. 8 is a view in section on the line 8—8 of Fig. 2. Fig. 9 is a similar view showing a slight modification.

As will be understood from Fig. 1, my device is embodied in a well known form of tackle box having two similar members 10 and 12 hinged together at one side by a hinge 14. Each of these members constitutes a shallow receptacle, the two members conjointly producing a box which can be readily opened and closed on account of the hinged construction. Fig. 2 shows in detail how each of the members may be utilized as means to which holders for hooks and leaders may be secured. The holders for hooks include housings 16 secured transversely to the cover of the box members. Fig. 2 shows four of these housings for each box member, but it will be understood that additional housings may be employed. Each of the housings 16 is adapted to receive a coiled spring 18 between adjacent turns of which hooks H carrying flies may be engaged as best shown in Fig. 7. It will be noted that one side of the housing is spaced from the wall to which it is attached in order to expose the spring for engagement by the hook. It will also be noted that the housing has an offset portion 20 to provide for the reception of the point of the hook as shown in Fig. 7. Fig. 4 shows a modified form of housing 16' having an inclined portion 22 so that the point of the hook is provided for. As shown in Fig. 8, the spring 18 is held in place by turning down the ends of the housing as indicated at 24. In the modified form shown in Fig. 9, the ends of the spring are provided with hooks 26 which hook through perforations in the ends of the housings. The housings are secured to the walls of the box members in any suitable manner as by eyelets 28 which provide ventilation openings.

A holder for leaders L is provided by an angle strip 30 secured transversely across the cover of the box member in any suitable manner as by eyelets 28. The upstanding flange of the strip 30 is furnished with holes 32 spaced along the length thereof, entrance to the holes 32 being provided for by slits in the edge of the strip. These slits may be disposed radially with relation to the holes 32 as indicated at 34 in Fig. 6 or may be placed tangentially as indicated at 34' in this figure. In either case, the material on one side of the slit is given a slight twist as shown in Figs. 2 and 5 to provide an entrance passage into the holes 32, these figures also showing how the leaders L are held. It will be noted that the holes 32 are of substantial size so that when wet leaders are placed therein, the gut of which the leaders is composed is not held in close contact with the metal surrounding the holes. This prevents rotting of the gut when the leaders remain in place for a considerable period of time.

The operation and advantages of my invention will be readily understood in connection with the foregoing description and the accompanying drawing. The device is well adapted for holding either ordinary hooks or hooks provided with flies. In use, the point of the hook is pushed between adjacent turns of the spring 18, the resiliency of which is sufficient to firmly hold the hook in place and yet permit it to be readily disengaged. The offset portion 20 of the housing or the inclined portion 22 thereof provide space for the point of the hook. It will be noted from Fig. 7 that the housing 16 keeps the spring 18 properly in place to receive the hook and yet permits sufficient yielding of the spring so that a large number of hooks may be held by a single spring. In regard to the angle strip 30, it will be understood from Figs. 2 and 5 that the free end portions of the leaders may be readily placed in and removed from the holes 32 by bending the leader. The natural resiliency of the leader is sufficient to keep it from being accidentally displaced. If desired, a number of leaders may be placed in the same opening 32. Ordinarily in the use of the device, the hook will first be engaged with the spring and the leader then grasped, forced into the deflected position shown and then inserted in one of the openings 32. It will however be understood from Fig. 2 that the device may be used for holding hooks which do not have leaders attached thereto.

Although I have shown and described certain specific embodiments of my invention, I am fully aware that other embodiments thereof are possible. My invention, therefore, is not to be restricted except insofar as is necessitated by the prior art and by the spirit of the following claims.

I claim:

1. In a fishing tackle box, the combination of a housing and a coiled spring in said housing, one side of said housing being arranged to expose said spring for engagement of fish hooks between adjacent turns of the spring.

2. In a fishing tackle box, the combination of a housing and a coiled spring in said housing, one side of said housing being arranged to expose said spring for engagement of fish hooks between adjacent turns of the spring and the other side of said housing containing a recess for receiving the points of the hooks.

3. In a fishing tackle box, the combination of a housing, a coiled spring in said housing, one side of said housing being arranged to expose said spring for engagement of fish hooks between adjacent turns of the spring, and means on the ends of said housing for retaining said spring while permitting separation of the turns thereof to receive the hooks.

4. In a fishing tackle box, the combination of a housing and a coiled spring in said housing, one side of said housing being arranged to expose said spring for engagement of fish hooks between adjacent turns of the spring and the ends of said housing being turned down for retaining said spring while permitting separation of the turns thereof to receive the hooks.

5. In a fishing tackle box, the combination of a housing having engaging means on the ends thereof and a coiled spring in said housing having bent portions on the ends thereof for engagement with said means, one side of said housing being arranged to expose said spring for engagement of fish hooks between adjacent turns of the spring.

6. In a fishing tackle box, the combination of a holder for fish hooks and a strip secured in upright position to the cover of said box and having openings for receiving intermediate portions of leaders attached to said hooks, the outer edge of said strip having slits leading into said openings and the material adjacent said slits being offset to provide entrance passages for the leaders.

EMMETT B. PERRINE.